United States Patent [19]
Nakanishi et al.

[11] Patent Number: 5,411,398
[45] Date of Patent: May 2, 1995

[54] MAGNETIC DISPLAY SYSTEM

[75] Inventors: Masayuki Nakanishi, Kanagawa; Yasuyuki Kanno, Hiratsuka, both of Japan

[73] Assignee: Japan Capsular Products, Inc., Chiyoda, Japan

[21] Appl. No.: 181,442

[22] Filed: Jan. 14, 1994

Related U.S. Application Data

[63] Continuation-in-part of Ser. No. 892,123, Jun. 2, 1992, abandoned.

[51] Int. Cl.[6] .............................................. B43L 1/00
[52] U.S. Cl. ................................. 434/409; 273/239; 428/321.5; 428/323; 428/328; 428/329; 428/402.2; 428/402.21; 446/131
[58] Field of Search ............. 273/239; 428/321.5, 428/323, 402.2, 402.21, 328, 329; 434/409; 446/131

[56] References Cited

U.S. PATENT DOCUMENTS

| | | | |
|---|---|---|---|
| 3,938,263 | 2/1976 | Tate | 434/409 |
| 4,232,084 | 11/1980 | Tate | 434/409 |
| 4,536,428 | 8/1985 | Murata et al. | 434/409 |
| 4,643,684 | 2/1987 | Murata et al. | 434/409 |
| 5,057,363 | 10/1991 | Nakanishi | 273/239 |

*Primary Examiner*—D. S. Nakarani
*Attorney, Agent, or Firm*—Wenderoth, Lind & Ponack

[57] ABSTRACT

A magnetic display system uses a display wherein a non-magnetic substrate has applied thereon a microcapsule coating layer having sealed light-absorptive magnetic particles and light-reflective non-magnetic particles which are dispersed in an oily liquid. A permanent magnet causes a shift of the light-absorptive magnetic particles in one direction and, as a result, causing a shift of the light-reflective non-magnetic particles in the other direction. In the microcapsule coating layer, microcapsules having a plurality of diameters within a range from 100 microns to 1,000 microns are combined together. Furthermore, the light-absorptive magnetic particles sealed in the microcapsules have a plurality of particle diameters ranging from 0.2 microns to several icons. A suitable amount of magnetic particles capable of becoming a permanent magnet when magnetized after the microcapsule coating layer is coated is added. The mean particle diameter of the light-reflective non-magnetic particles sealed in the microcapsules ranges from 0.01 microns to several microns. A suitable amount of the microcapsules having a particle diameter far more minute than the mean particle diameter of the microcapsules and having sealed therein only the transparent oily liquid is added to the microcapsule coating layer.

11 Claims, 6 Drawing Sheets

MAGNETIC DISPLAY SYSTEM

This application is a Continuation-in-part of now abandoned application Ser. No. 07/892,123, filed Jun. 2, 1992, now abandoned.

BACKGROUND OF THE INVENTION

1. Field of the Invention

This invention relates to a magnetic display system wherein the vertical position of light-absorptive magnetic particles and light-reflective non-magnetic particles is reversed in microcapsules to absorb or reflect incident light, thereby forming a contrast image of brightness and darkness therebetween.

2. Description of the Prior Art

As a first conventional technique concerning magnetic display systems, there is a magnetic display system in which a transparent plastic sheet is formed over the entire surface thereof with honeycomb-like cavities, each with a dimension of about 2 mm side and depth. Each cavity is filled with a white pigment liquid and magnetic particles and is sealed with a transparent sheet to prevent leakage of the filling matter. In this case, a rod-like permanent magnet is shifted over the entire display surface from one end of the back surface of the magnetic display to the other, thus bringing the magnetic particles in each honeycomb-like cavity toward the back side of the display plate and leaving a white color of the white pigment on the front surface. By moving a rod-like magnetic pen with its writing end in contact with the white surface of the display, the magnetic particles in the described area are brought to the front surface, thus forming an image.

A second magnetic display system utilizes a display in which microcapsules having sealed magnetic particles having anisotropy of shape are coated onto a non-magnetic substrate. A permanent magnet is a means to change the polarity orientation of the magnetic particles partially or totally, thereby forming and erasing images.

Furthermore, a third magnetic display system utilizes a display in which microcapsules having sealed magnetic particles and non-magnetic particles are coated and arranged on a substrate. A permanent magnet is a means for forming and erasing images by reversing the position of the magnetic particles and the non-magnetic particles in the microcapsules.

However, out of the above-described conventional magnetic display systems, in the first, an image is formed by a shift of magnetic particles in honeycomb-like cavities from the back surface to the front surface. Thus, it is impossible to obtain an image resolution sharper than the size of the honeycomb-like cavity, and it is technically difficult to make the size (breadth and depth) of each honeycomb cavity smaller than currently, on the order of a few millimeters. Further, it is not easy to perform the processes of molding for providing honeycomb-like cavities and of sealing the white pigment liquid and the magnetic particles, and it is almost technically impossible to make a display board providing honeycomb-like cavities have a size as large as a blackboard. Even if it is technically possible, high costs cannot be avoided. Further, such disadvantages are presented that it is technically extremely difficult to pour and seal the white pigment liquid and the magnetic particles into the honeycomb-like cavities provided over the entire surface having the above-described dimensions. Also, it is not easy to make the display have a size as small as pocket size, due to the construction noted above, and even if the display is made small in size, because of the fact that the honeycomb construction has a thickness of several millimeters, excessive weight for portable use cannot be avoided.

Furthermore, as compared with the display system in which the magnetic particles and the white pigment are sealed into the honeycomb-like cavities provided by plastic molding in the first conventional magnetic display system, the second is greatly advanced in that the quality of characters and images that can be formed is very superior, the polarity orientation of magnetic particles can be changed with a very slight magnetic flux, and further, a display having a desired size can be readily obtained. However, this system requires magnetic particles of nickel, or alloys thereof, capable of providing a surface gloss, having anisotropy of shape and having a flakier shape (i.e., a flat and elongated shape) than those of ferrite or iron oxide obtainable by mass production, as well as readily capable of polarization, because it is necessary to provide a strong contrast between light absorption when the particles are orientated vertically and light reflection when the particles are orientated horizontally. Disadvantageously, this leads to increased costs.

Next, according to the third conventional magnetic display system, the display is characterized by a construction in which the light-absorptive magnetic particles and the light-reflective non-magnetic particles are dispersed in an oily liquid, sealed into the microcapsules and coated on a substrate, and can offer the following numerous advantages as compared with the above-described first and second systems. As compared with the system in which the magnetic particles and the white pigment liquid are sealed into the honeycomb-like cavities provided on the substrate, microcapsules having minute particles diameters are utilized. Advantages are that side edge portions of characters and images that are formed can be made sharper. Amounts of the magnetic particles, non-magnetic particles and oily liquid for dispersion required for a given area of the display can be greatly decreased. A great cost reduction is possible as compared with the processes of molding the honeycomb-like cavities and of filling-sealing of the filling material. Possibilities in the selection of a rigid sheet, a soft and flexible film or the like for the substrate coated thereon with the microcapsules allow selections of various shapes of displays, such as a board type, a sheet type and a roll-scroll type. Selection of the display having a desired size can be made from mass produced sheets through cutting.

Furthermore, as compared with the prior art display systems in which the polarity orientation of the magnetic particles is inverted in the microcapsules, in the third prior art, advantages are that the magnetic particles used can be obtained at overwhelmingly low costs, and the means for forming and erasing the characters and images can be greatly simplified.

As described above, as compared with the display systems cited as the first prior art system and the second prior art system, the third prior art system has many advantages. According to the present invention, this third prior art system is further improved so that, mainly, improvements in the quality of characters and images can be achieved.

SUMMARY OF THE INVENTION

The present invention provides a distinct improvement of a magnetic display system using a display comprising a non-magnetic substrate sheet coated with a layer of microcapsules, where each capsule contains both light-absorptive magnetic and light-reflective non-magnetic particles dispersed in a liquid phase. The light-absorptive magnetic particles migrate from the bottom to the top of the capsules, with a reverse migration of the light-reflective non-magnetic particles, when a magnetic field is applied from the top surface of the sheet, and vice-versa when a magnetic field is applied from the bottom surface of the sheet.

The improvements are as follows. In our experiments it has been found to be true that the larger the size of the microcapsules containing both magnetic and non-magnetic particles, the better the contrast of the display formed between absorption and reflection of incident light by the magnetic and the non-magnetic particles inside of the microcapsules. It has been, however, found also to be true that the larger the size of the microcapsules, the poorer the edge sharpness of the display formed. Likewise, it has been found to be true that the larger the size of the magnetic particles contained in the microcapsules, the faster the magnetic response when a magnetic field is applied, but a poorer contrast of the display formed.

It has also been found that the smaller the size of the magnetic particles, the clearer the contrast, but a slower magnetic response is provided. A similar contradiction is found when the magnetic particles contained in the microcapsules are mixed with particles of hard magnetic material comprising ferrite capable of becoming a permanent magnet. A magnetic response substantially faster than the same without the particles of hard magnetic material comprising ferrite is provided but poorer edge sharpness of the display results, as well as a less stable display over the passage of time.

Another contradiction found is that when a size-mix for the magnetic and/or non-magnetic particles is fixed as an invariable, the higher the viscosity of oily liquid disperser, the better stable display over the passage of time but with a slower magnetic response of the particles when a magnetic field is applied. The converse is also true; the lower the viscosity of the oily liquid disperser, the poorer stable display over the passage of time but with a faster magnetic response of the particles. In our experiments, the magnetic response of the $Fe_3O_4$ particles in the microcapsules becomes extremely slow in a viscous oily liquid disperser with a measured viscosity of 60 centipoise or higher on the Brookfield Viscometer using a No. 1 rotor, regardless of the size-mix for the particles and whether the particles are surface treated or not.

Another finding relates to the specific gravity of the oily liquid disperser. Any oily liquid disperser with a gravity higher than or lower than the optimum range makes it extremely difficult to encapsulate the magnetic and/or the non-magnetic particles into the microcapsules. The tests and experiments indicate that, apart from its chemical and physical stability over passage of time, the desirable and the ideal properties of the oily liquid disperser for the particles of $Fe_3O_4$ and $TiO_2$ are as follows:

|  | Optimum Properties | |
| --- | --- | --- |
|  | Desirable | Ideal |
| Affinity for water | Minimum | Zero |
| Viscosity (at 20° C.) | 3–50 cP | 5–20 cP |
| Specific Gravity (at 20° C.) | 0.85–1.05 | 0.90–1.00 |

To satisfy such contradictory conditions, the present invention discloses optimum physical properties of the oily liquid disperser for the particles of $Fe_3O_4$ and $TiO_2$ and an optimum mixture of two different size ranges of microcapsules containing both light-absorptive magnetic and light-reflective non-magnetic particles, along with the addition of relatively small size microcapsules containing only an oil to the layer of microcapsules.

An optimum mixture of different sizes of magnetic particles, and the mixing of the particles of a hard magnetic material comprising ferrite, capable of becoming a permanent magnet, into $Fe_3O_4$ particles, are also disclosed. The mixture of two different size ranges of microcapsules, used together with the small oil-only containing microcapsules, is effective to provide a good display. The oil-only containing microcapsules help to enhance absorption and reflection of incident light due to relative reflection between the oil and the magnetic particles versus the same between the oil and the non-magnetic particles. They also help to remove any unevenness of the coated surface of the microcapsule layer. The mixture of different sizes of magnetic particles, together with the particles of hard magnetic material comprising ferrite, capable of becoming a permanent magnet, is effective to enhance agglomeration of the magnetic particles inside the microcapsules when a magnetic field is applied, making the magnetic response faster and the visual contrast of the display formed clearer. Whereas it is true that the addition of the particles of hard magnetic material comprising ferrite is somewhat detrimental to edge sharpness of the display, such a shortcoming can be reduced to a minimum when the amount of the addition is adjusted adequately. In our experiment, it has been found that while an addition of the particles of hard magnetic material comprising ferrite should obviously help agglomerate $Fe_3O_4$ particles, the resultant agglomeration tends to make the agglomerated surface look microscopically like eruptive rocks. This is most probably due to the fact that the existence of the particles of hard magnetic material comprising ferrite, besides $Fe_3O_4$ particles, has caused the former particles to become a core, and the latter particles cling together pole to pole around the core's surface, making an overall shape after agglomeration look like eruptive rocks rather than a spherical shape.

A magnetic device includes a permanent magnet, and serves as a means for causing a shift by attracting the light absorptive-magnetic particles toward the back surface of the display over the entire surface of the microcapsule coating layer and, as a result, causing a shift of the light-reflective non-magnetic particles toward the front surface of the display. The magnetic device further serves as a means for causing a local shift by attracting the light-absorptive magnetic particles having been shifted by attraction from the back surface of the display to the front side thereof to thereby invert the position of the light-reflective non-magnetic particles in corresponding areas, thereby forming characters and images.

The microcapsules have an oily liquid contained and dispersed therein with the light-absorptive magnetic particles and the light-reflective non-magnetic particles, and are of such an arrangement that a wall film thereof is formed of a polymer film that is substantially transparent and has a strength capable of semipermanently holding the filling matter. The microcapsules have a plurality of particles diameters ranging from a maximum of 1,000 microns to a minimum of 100 microns and are combined at a suitable ratio.

As for the magnetic particles dispersed in the oily liquid in the microcapsules, one type or several types of particle diameters, within a range from minimum particle diameters of 0.2 microns to maximum particle diameters of several microns, are combined together.

Furthermore, a suitable amount of the particles of hard magnetic material comprising ferrite, capable of becoming a permanent magnet, is added to the magnetic particles dispersed in the oily liquid in the microcapsules. After the microcapsules are coated onto the substrate, the particles of hard magnetic material comprising ferrite are magnetized to become a permanent magnet.

Furthermore, to obtain movability in the oily liquid of the magnetic particles and non-magnetic particles dispersed in the oily liquid in the microcapsules, a surface treatment is made to provide their surface with a property of affinity to the oily liquid disperser in the microcapsules.

The surface treatment is also essential for making the microcapsules containing the oily liquid with dispersed $Fe_3O_4$ and $TiO_2$ particles therein. In encapsulation processes, the internal phase, namely the $Fe_3O_4$ and $TiO_2$ particles dispersed in an oily liquid, needs to be agitated in a tank filled by an aqueous gelatin solution in order to obtain optimum size droplets of the internal phase. If, however, there is any wetting property or affinity to water residing in surface of the particles, these particles, particularly the $Fe_3O_4$ particles with a heavier gravity, tend to be forced out of the oily liquid disperser into the aqueous gelatin solution due to centrifugal force inevitably applied by the agitation.

Among various silicone compounds, it is found that dipping and subsequent baking with silicone fluids of methylchlorosilane and hexamethyldisilazane have been most effective to form an extremely thin polymer water repellent film onto surfaces of the $Fe_3O_4$ and the $TiO_2$ particles, respectively, in the surface treatment.

Furthermore, the ratio of compounding between the light-absorptive magnetic particles and the light-reflective non-magnetic particles which are dispersed in the oily liquid in the microcapsules is within a range from 1:8 to 1:1.

Furthermore, a magnetic display system comprises a display having a microcapsule coating layer applied onto a non-magnetic substrate. The microcapsules have therein sealed magnetic particles having an excellent light absorptive surface characteristic and also sealed non-magnetic particles having an excellent light-reflective characteristic, both particles being dispersed in an oily liquid.

A magnetic device includes a permanent magnet serving as a means for causing a shift by attraction of the light-absorptive magnetic particles toward the back surface of the display over the entire surface of the microcapsule coating layer and, as a result, causing a shift of the light-reflective non-magnetic particles toward the front surface of the display. The magnetic device further serves as a means for causing a local shift by attraction of the light-absorptive magnetic particles having been shifted by attraction from the back surface of the display to the front surface thereof to thereby invert the position of the light-reflective non-magnetic particles in corresponding areas, thereby forming characters and images.

A suitable amount of oil-containing microcapsules, with their walls being substantially transparent and having a more minute particle diameter than the mean particle diameter of the microcapsules containing light-absorptive magnetic particles and light reflective-non-magnetic particles, is embedded in the microcapsule coating layer.

Furthermore, the distribution of the particle diameters of the microcapsules having the light-absorptive magnetic particles and the light-reflective non-magnetic particles which are dispersed in the oily liquid is optimized, so that the side edge portions of the characters and images can be made sharper.

Furthermore, the light-absorptive magnetic particles are minimized for the purpose of increasing the outer surface areas of the light-absorptive magnetic particles dispersed in the oily liquid in the microcapsules, and a plurality of light-absorptive magnetic particles which are different in particle diameter are combined together, so that the contrast of brightness and darkness can be improved by the agglomerating effect of the minute light-absorptive magnetic particles at the time of forming the characters and images.

Furthermore, a suitable amount of the magnetic particles, which become a permanent magnet by magnetizing the after the microcapsule coating layer is coated, is added to the light-absorptive magnetic particles dispersed in the oily liquid in the microcapsules, so that the movability and agglomeration property of the light-absorptive magnetic particles in the microcapsules are intensified, thereby improving the responsiveness in forming and erasing of the characters and images and the contrast of brightness and darkness.

Furthermore, the surfaces of the light-absorptive magnetic particles and the light-reflective non-magnetic particles which are dispersed in the oily liquid in the microcapsules are surface treated for movability during the inverting of their positions.

Furthermore, the ratio between the light-absorptive magnetic particles and the light-reflective non-magnetic particles which are dispersed in the oily liquid in the microcapsules is optimized so that the contrast between brightness and darkness can be improved.

Furthermore, a suitable amount of the microcapsules having a minute particle diameter and which contain only the oily liquid is embedded in the microcapsule coating layer, so that the surface smoothness of the microcapsule coating layer can be improved. Further, the light refractive index of the oily liquid in the microcapsules is utilized to reinforce the light absorption property of the light-absorptive magnetic particles and light reflection property of the light-reflective non-magnetic particles.

DETAILED DESCRIPTION OF THE PREFERRED EMBODIMENTS

The present invention will hereunder be described in detail with reference to the embodiments shown in the drawings.

Figure 1:
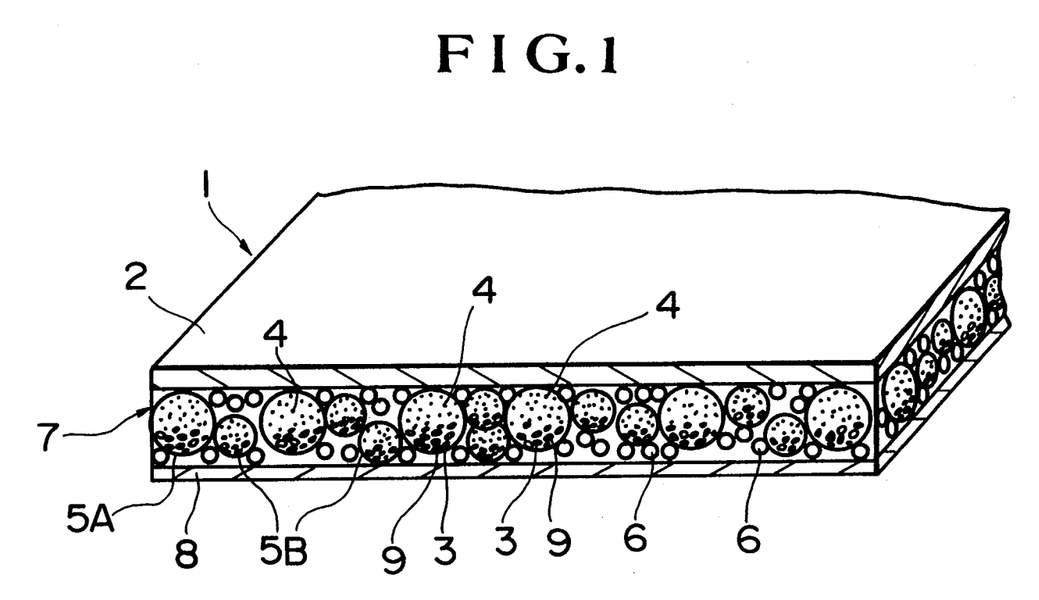
FIG. 1 is a cross-sectional view of a display according to the present invention.

Referring to the drawings, designated at 1 is a display. This display 1 has microcapsules 5, containing therein light-absorptive magnetic particles 3 and light-reflective non-magnetic particles 4, and oil-containing microcapsules 6 containing neither magnetic particles nor non-magnetic particles, each having a minute particle diameter, are coated onto the entire back surface of a non-magnetic substrate 2 to form a microcapsule coating layer 7. A protective layer 8 prevents the microcapsules 5 (5A and 5B) and the oil-containing microcapsules 6 from being ruptured due to frictional pressure. The non-magnetic substrate 2 can be in the form of a rigid sheet or a soft and flexible film made of plastics, glass fibers, glass, paper and the like which have strengths capable of satisfactorily holding the microcapsule coating layer 7.

Description will hereunder be given for the microcapsule coating layer, which consists of the microcapsules 5 (5A and 5B) containing the light-absorptive magnetic particles 3 and the light-reflective non-magnetic particles 4, and the oil containing microcapsules 6.

Now, the important characteristics of the magnetic display according to the present invention reside in that, by applying a magnetic field, the light-absorptive magnetic particles 3 are shifted in the microcapsules 5 (5A and 5B). As a result, the light-reflective non-magnetic particles 4 also change the positions. Therefore, the image quality is determined by the intensity of the contrast between brightness and darkness caused by the light absorption of the light-absorptive magnetic particles 3 and the light reflection of the light-reflective non-magnetic particles 4, the degree of sharpness of the side edge portions of the characters and images caused by the contrast, the fact that the inversion of the position of the light-absorptive magnetic particles 3 and the light-reflective non-magnetic particles 4 has been performed for a short period of time and the possibility of maintaining the characters and images produced by the inversion of the position. The improvements in the above-described image quality is achieved by the optimal combination of the contradicted factors exemplified in the following.

TABLE 1

| | Contrast of brightness and darkness | Sharpness of side edge portions | Degree of freedom in selecting fine or bold writing | Responsiveness in writing in and erasing | Stability of images |
| --- | --- | --- | --- | --- | --- |
| microcapsule size | | | | | |
| large | ◉ | X | X | ○ | ○ |
| small | X | ◉ | ◉ | ○ | ○ |
| magnetic particles size | | | | | |
| large | ◉ | X | X | ◉ | X |
| small | △ | ◉ | ◉ | X | ◉ |
| non-magnetic particles size | | | | | |
| large | ◉ | X | X | X | △ |
| small | X | △ | ◉ | ◉ | ◉ |
| lipophility of dispersed particles size | | | | | |
| large | △ | △ | △ | ◉ | ○ |
| small | △ | △ | △ | X | ○ |
| viscosity of particle dispersion medium | | | | | |
| high | △ | △ | △ | X | ◉ |
| low | △ | △ | △ | ◉ | X |

Note:
◉ Excellent
○ Good
△ No influence
X No good

According to the present invention, to optimize the combination of the above-described factors, the microcapsules 5 (5A and 5B) have a plurality of particle diameters. The light-absorptive magnetic particles have a plurality of particle diameters and the light-reflective non-magnetic particles have a plurality of particle diameters and are combined together. The ratio of compounding between the light-absorptive magnetic particles 3 and the light-reflective non-magnetic particles 4 is adjusted. The light-absorptive magnetic particles 3 and the light reflective non-magnetic particles 4 are subjected to lubricating treatment. Magnetic particles 9, capable of becoming a permanent magnet by being magnetized after the microcapsule coating layer 7 is coated, are added to the light-absorptive magnetic particles 3. The oil-containing microcapsules 6, containing neither light-absorptive magnetic particles 3 nor light-reflective non-magnetic particles 4, are suitably arranged in the microcapsule coating layer 7.

First, regarding the microcapsules 5 (5A and 5B) containing therein the light-absorptive magnetic particles 3 and the light-reflective non-magnetic particles 4, in this embodiment, as the light-absorptive magnetic particles 3, particles of $Fe_3O_4$ containing therein 10% of manganese dioxide applied onto the surfaces thereof with silicone treatment and having a particle diameter of 0.5 micron, and other particles similar to the above, but having a particle diameter of 0.3 micron, are mixed together at a ratio of 3:1 for use. Furthermore, as the light-reflective non-magnetic particles 4, white particles of titanium oxide applied onto the surfaces thereof with the surface treatment and having a mean particle diameter of 0.3 micron are used.

The light-absorptive magnetic particles 3 and the light-reflective non-magnetic particles 4 are dispersed in dibutyl phthalate by 4% and 14% by weight, respectively to obtain a dispersion liquid.

Next, an 11% (by weight) aqueous Gum Arabic solution was added to an 11% (by weight) aqueous gelatin solution at pH 6 to thereby obtain an aqueous solution system for polymer films of the microcapsules. The system was elevated in temperature to about 50° C. with an adjustment of pH to 4.0.

Then, the previously prepared dispersion liquid of dibutyl phthalate containing the light-absorptive magnetic particles 3 and the light-reflective non-magnetic particles 4 was added to the aqueous solution system of the polymer at the rate of 1:1, and the resultant system was agitated until it shears the dispersion liquid into droplets of about 400 microns. After the above dispersion droplets were obtained, hot water at 50° C. of four times the amount of the 11% (by weight) aqueous gelatin solution was added thereto, and the system was slowly lowered in temperature to 10° C. while maintaining the pH at 4.0, whereby polymerized film of gelatin separated out of the aqueous solution and deposited and gelled at the interface of the droplets. Then, a 25% (by weight) glutar aldehyde solution for the amount equal to 5% in weight of the 11% (by weight) aqueous gelatin solution was added for cross-linking, so that the polymer films formed at the interface of the droplets were solidified. Thus microcapsules 5A were obtained.

Similar operations to the above were performed to produce microcapsules 5B, but with the agitation shearing the dispersed liquid into droplets of about 200 microns, instead of 400 microns.

The oil-only-containing microcapsules 6 will hereunder be described. First, an 11% (by weight) aqueous gelatin solution at pH 6 and an 11% (by weight) aqueous Gum Arabic solution were prepared. Added into the above 11% (by weight) aqueous gelatin solution was dibutyl phthalate by 80% in weight. The resultant system was agitated to produce an O/W type emulsion (oil droplets suspended in the aqueous gelatin solution) with a size of droplets of about 40 microns. The 11% (by weight) aqueous Gum Arabic solution already prepared, equal in amount to the aqueous gelatin solution, was added to the emulsion and elevated in temperature to 50° C. Thereafter, the pH of the system was lowered to 4.5, and hot water at 50° C. of four times the amount of the aqueous gelatin solution was added thereto with stirring and with lowering the temperature slowly to 10° C., so that gelatin polymer films formed at the interface were gelled. Then, a 25% (by weight) aqueous glutar aldehyde solution equal to 5% in weight of the aqueous gelatin solution was added for cross-linking, so that the gelatin polymer films were solidified. Thus, minute oil-only-containing microcapsules were obtained.

The microcapsules 5A and 5B and the oil-containing microcapsules 6, which were obtained according to the above-described method, were obtained as a slurry containing about 20% microcapsules. The respective ones of the slurry were combined at a ratio of 10:5:3, and the water content of the slurry was reduced to one half, and an aqueous solution of 10% polyvinyl alcohol equal in amount thereto was added, thus obtaining a coating liquid in which the microcapsules 5A, 5B and oil-containing microcapsules 6 were mixed together. It is noted that the aqueous solution of polyvinyl alcohol could be substituted with many other available materials and is, in any case, an auxiliary material.

This coating liquid was coated on the back surface of the surface-prepared non-magnetic substrate 2 formed of a 100 micron thick polyethylene telephthalate sheet by use of a curtain coated with a blade to a wet thickness of about 500 microns. The layer thus coated was dried by hot air, thus obtaining a sheet of the display 1.

Other embodiments will hereunder be described. As the light-absorptive magnetic particles 3, there are there components, including particles of $Fe_3O_4$ containing therein 10% of manganese dioxide applied on the surfaces thereof with silicone treatment and having a particle diameter of 0.5 microns, other particles similar to the above, but having a particle diameter of 0.3 microns, and anisotropic samarium cobalt magnetic particles 9 applied on the surfaces thereof with silicone treatment and having a particle diameter of 1.0 micron (composition: Sm 25.5%, Co 50%, Cu 8%, Fe 15% and Zr 1.4%), all of which are mixed together by 60%, 30% and 10% by weight for use.

Furthermore, as the light-reflective non-magnetic particles 4, white fine particles of titanium oxide applied on the surfaces thereof with lipophilic treatment and having a mean particle diameter of 0.3 micron and the mixed magnetic particles described above were dispersed in dibutyl phthalate by 5% and 15% by weight, respectively.

This system of dispersion is sealed in the microcapsules 5 by the same method as in the above embodiment, whereby the microcapsules 5A and 5B having the mean particle diameters of two types were obtained. The microcapsules 5A and 5B and the oil-containing microcapsules 6 having the particle diameter of 40 microns which was obtained by the same method as the above embodiment were combined at a ratio of 10:5:3, a mixed coating liquid obtained by adding an aqueous solution of 10% polyvinyl alcohol was coated on the back surface of a surface-prepared polyethylene telephthalate sheet having a thickness of 100 microns and dried, and thereafter anisotropic samarium cobalt magnetic particles 9, specially added to the microcapsules 5 as a component of the magnetic particles, were magnetized to form a permanent magnet. As compared with the display in the above embodiment, the sheet of the display 1 thus obtained was superior in the responsiveness of writing and erasing and the sharpness of the images.

Figure 2:
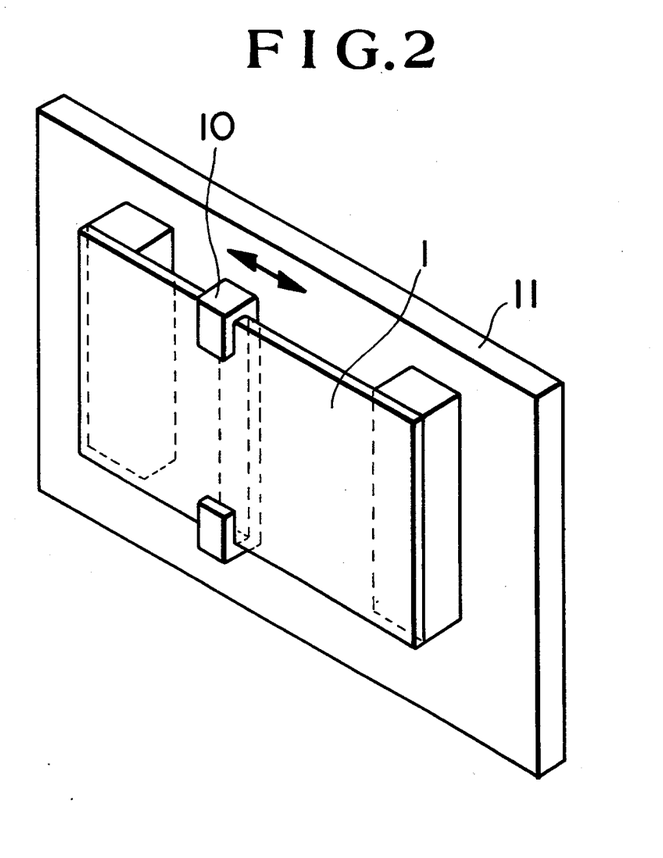
FIG. 2 is perspective view showing magnetic device for causing a shift by attraction of light-absorptive magnetic particles in microcapsules toward the bottom portion of the microcapsules, i.e. the back surface of the display, over the entire surface of the display.
Figure 3:
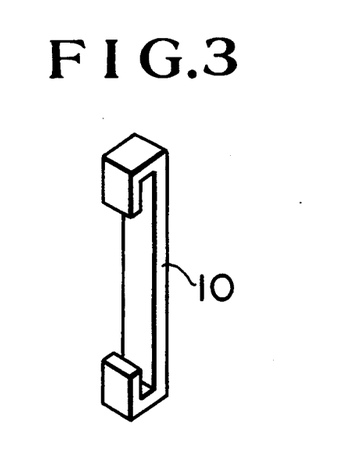
FIG. 3 is a view of the magnetic device shown in FIG. 2.

FIG. 2 shows a state where there is mounted onto a support member 11 the magnetic device 10 for casing a shift by attraction of the light-absorptive magnetic particles 3 and the magnetic particles 9, being a permanent magnet in the microcapsules 5 (5A and 5B), toward the back surface of the display 1. The microcapsules 5 (5A and 5B) and the oil-containing microcapsules 6 are coated on the back surface of the non-magnetic substrate 2 to form the microcapsule coating layer 7 over the entire surface of the display 1. As this magnetic device 10, a strip-like elongated permanent magnet is used. This magnetic device 10 is used as a slider and is slidably moved from one end to the other end of the back surface of the display 1 so that the light-absorptive magnetic particles 3 and the magnetic particles 9 can be shifted by attraction toward the back surface of the display 1.

Figure 4:
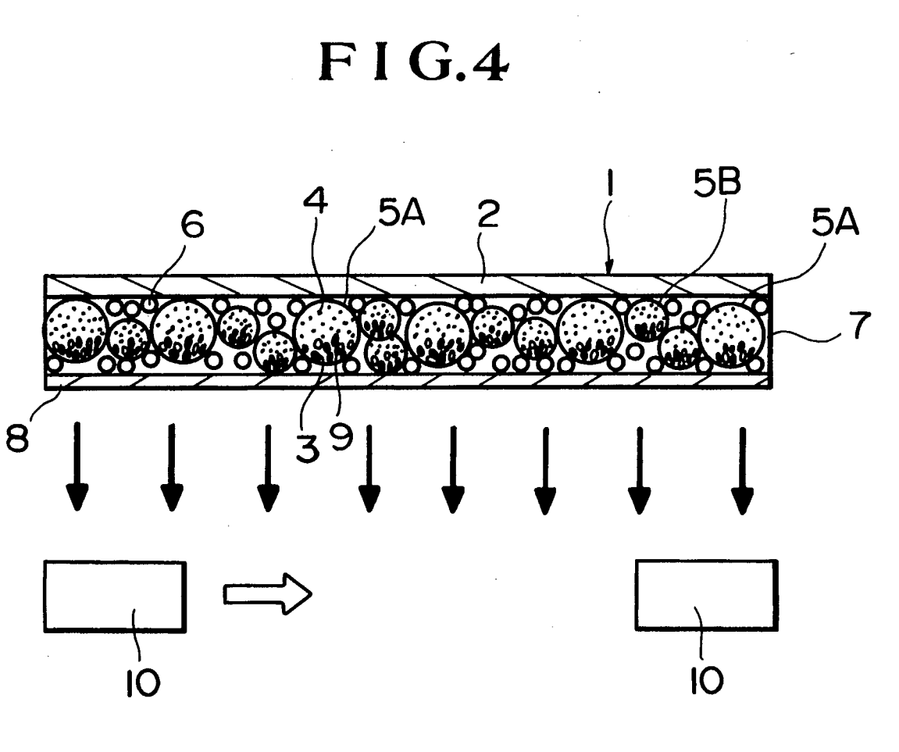
FIG. 4 is a cross-sectional view showing the light-absorptive magnetic particles in the microcapsules shifted by attraction toward the bottom portion of the microcapsules, i.e. toward the back surface of the display, over the entire surface of the display.

FIG. 4 shows a state where, when the magnetic device 10 is moved from one end to the other end of the back surface of the display 1, the light-absorptive magnetic particles 3 and the magnetic particles 9 are attracted by the magnetic device 10 to move downwardly, and the light-reflective non-magnetic particles are shifted upwardly.

Figure 5:
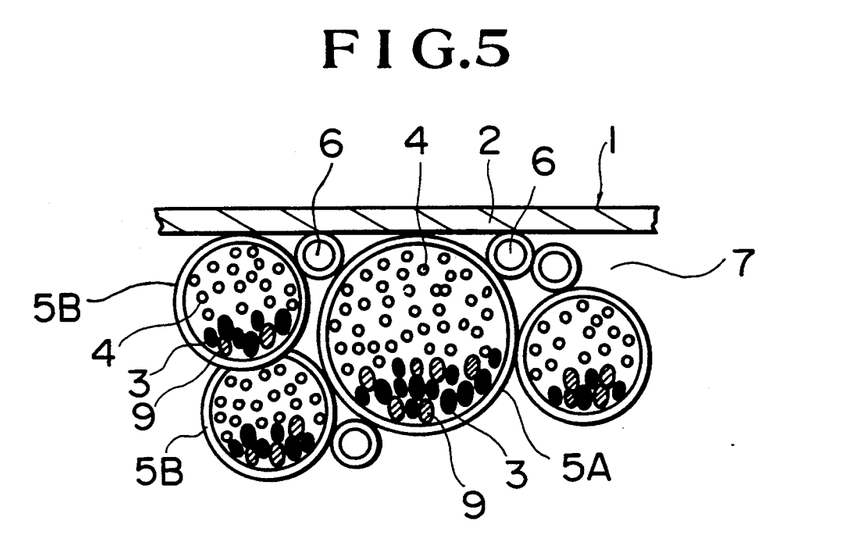
FIG. 5 is an enlarged view showing the microcapsules of FIG. 4.

FIG. 5 is enlarged view showing the microcapsules 5 (5A and 5B) shown in FIG. 4. When the display 1, which is in a state where the light-absorptive magnetic particles 3 in the microcapsules 5 are shifted downwardly and the light-reflective non-magnetic particles 4 in the microcapsules 5 are shifted upwardly, as described above, is seen from the outer surface, incident light is reflected by the light-reflective non-magnetic particles 4. The entire surface of the display 1 thereby assumes a white color.

Figure 6:
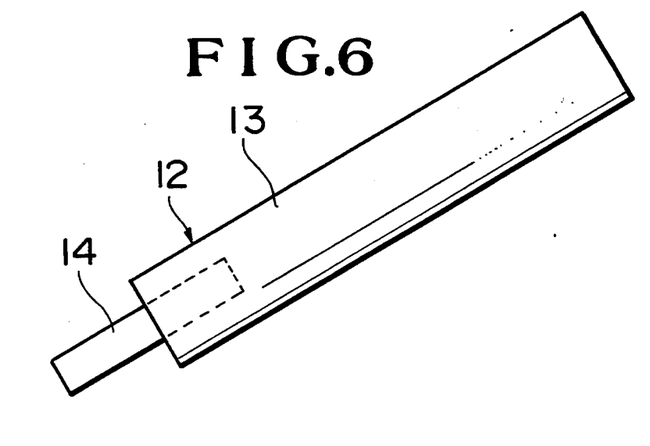
FIG. 6 illustrates a magnetic device for forming characters and images on the display surface.

FIG. 6 shows a state in which a forward end of the rod-like permanent magnet 14, which is magnetized at two poles and mounted onto the holder 13, is moved in contact with the surface of the non-magnetic substrate 2 of the display 1, whose entire surface assumes the white color by reflection. When characters and like images are drawn, the light-absorptive magnetic particles 3 in the microcapsules 5 (5A and 5B) in the corresponding areas are shifted upwardly and the light-reflective non-magnetic particles 4 are shifted downwardly.

Figure 7:
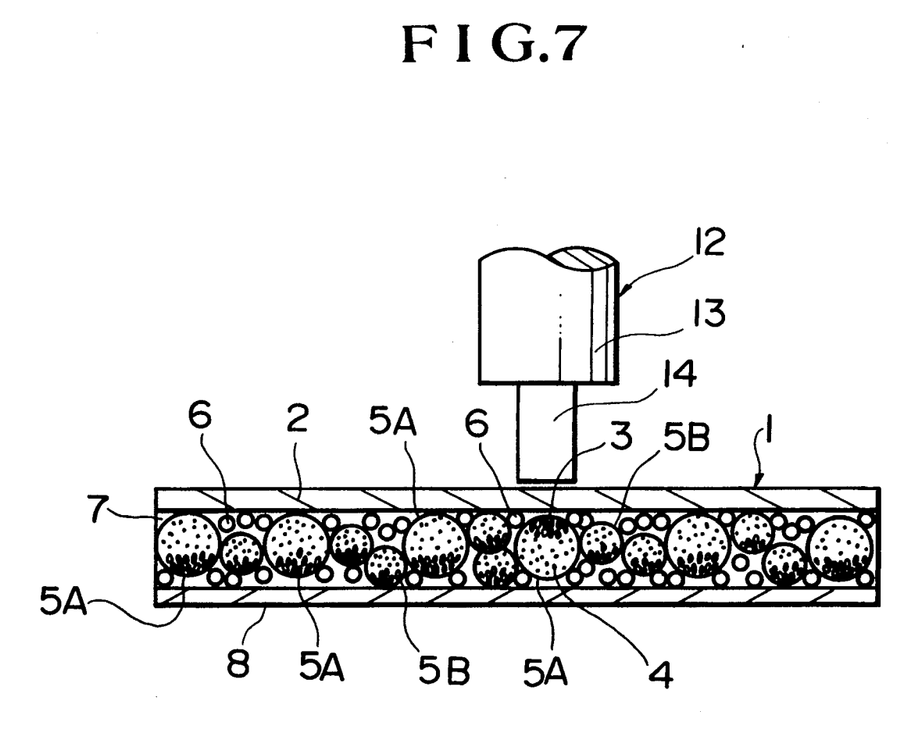
FIG. 7 is a cross-sectional view showing the inversion of the position of the light-absorptive magnetic particles and the light-reflective non-magnetic particles in the microcapsules when characters and images are formed on the display surface.
Figure 8:
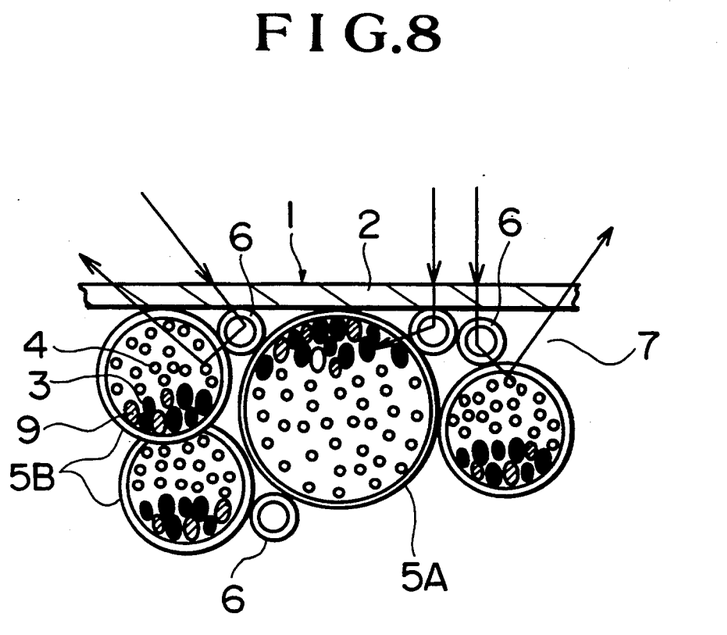
FIG. 8 is an enlarged view showing the absorption and reflection of light when the light falls into the microcapsules shown in FIG. 7.

FIG. 8 is an enlarged view showing the refection and absorption of light when the light falls into the microcapsules 5 shown in FIG. 7.

When the portion in which the light-absorptive magnetic particles 3 in the microcapsules 5A and 5B have been shifted upwardly as described above is seen from the outer surface of the display 1, incident light is absorbed by the light-absorptive magnetic particles 3, and the portion assumes a black color. That is, white color reflection caused by the light-reflective non-magnetic particles 4 is given to the surface of the display 1 through the operation shown in FIG. 4, and thereafter the same surface is partially turned into a black absorption color caused by the light-absorptive magnetic particles 3 through the operation shown in FIG. 6 so that the characters and images can be displayed.

As described above, according to the present invention, first, a combination of contradicted factors is optimized, thus improving the image quality of the display. That is, in order to intensify the contrast of brightness and darkness of the images on the display, which is caused by the positional relationship between the light-absorptive magnetic particles 3 and the light-reflective non-magnetic particles 4, the particle diameter of the microcapsules 5 is made as large as possible, whereby, when the light-absorptive magnetic particles 3 are positioned at the bottom portion of the microcapsules 5 (5A and 5B), a layer of the light-reflective non-magnetic particles 4 disposed thereabove should be thickened. Whereas, when the light-reflective non-magnetic particles 4 are positioned in the bottom portion of the microcapsules 5, a layer of the light-absorptive magnetic particles 3 should be thickened, whereby the mutually shielding forces for a powder color disposed at the bottom portions should be intensified. However, in this case, the images become rough, whereby the side edge portions of complicated characters, and images small in width, become unclear.

On the contrary, if the particle diameter of the microcapsules 5 is reduced, then the images become dense and the side edge portions of the images are sharpened. However, the layers of the light-absorptive magnetic particles 3 and the light-reflective non-magnetic particles 4 are made thinner, whereby the mutually shielding forces of the light-absorptive magnetic particles 3 and the light-reflective non-magnetic particles 4 for the powder color become unsatisfactory, and the contrast of brightness and darkness is weakened. According to the present invention, for the purpose of making the above-described contradicted factors consistent, the microcapsules 5A and 5B containing the light-absorptive magnetic particles 3 and the light-reflective non-magnetic particles 4, which have particle diameters of two types, and the oil-containing microcapsules 6 having a minute particle diameter, are combined to form a microcapsule coating layer 7 of the display.

In order to compensate the unsatisfactory shielding force of the microcapsules 5B, having a smaller particle diameter, out of the combined microcapsules 5A and 5B, the oil-containing microcapsules 6 having the minute particle diameter is added to and combined with the microcapsules 5A and 5B containing therein both the light-absorptive magnetic particles 3 and the light-reflective non-magnetic particles 4. When the images formed by the light-absorptive magnetic particles 3 in the microcapsules 5A and 5B are present on the surface of the display 1, due to the presence of the oil-containing microcapsules 6 having the minute particle diameter, light which has fallen onto the surface, consisting of lines of the image, through the oil-containing microcapsules 6 present at the top surfaces or the adjoining portions of the microcapsules 5A and 5B, is transmitted and absorbed by the layer of the light-absorptive magnetic particles 3, because the difference between the refractive index of dibutyl phthalate, 1.49, and the refractive index of the light-absorptive magnetic particles 3, 1.65, is small. Light which has fallen onto a portion other than the surface consisting of lines of the image is intensified in reflection by the layer of titanium dioxide, because the difference between the refractive index of dibutyl phthalate in the oil-containing microcapsules 6 and the refractive index 2.71 of titanium dioxide is large.

With this arrangement, the unsatisfactory contrast of brightness and darkness during formation of the images by the microcapsules 5B can be advantageously compensated.

Furthermore, the particle diameters of the light-absorptive magnetic particles 3 dispersed in the oily liquid in the microcapsules 5A and 5B are minimized to be formed to provide particle diameters of two types. Dense agglomeration and absorption can then be obtained in the portions forming the characters and images. Since the surface areas increased by minimizing the particle diameters can be utilized, the ratio of the light-absorptive magnetic particles 3 to titanium dioxide is reduced. When the portion other than the portion for the characters and images, i.e., the light-absorptive magnetic particles 3, is positioned at the bottom portions of the microcapsules 5A and 5B, the portion of the layer of titanium dioxide positioned thereabove is thickened to increase the light reflection property, thereby resulting in an improved contrast of brightness and darkness of the display.

Then, when the minute particle diameters of two types are used for the light-absorptive magnetic particles 3 and the magnetic field is provided, particles having a relatively small particle diameter agglomerate around particles having a relatively large particle diameter, whereby the movability for inverting the position in the microcapsules 5A and 5B becomes satisfactory and the density of agglomeration of the particles of the light-absorptive magnetic particles 3 sealed in the microcapsules 5A and 5B for forming the characters and images are enhanced. Further, adding a small quantity of the anisotropic samarium cobalt magnetic particles 9 to the light-absorptive magnetic particles 3 dispersed in the oily liquid in the microcapsule 5A and 5B makes it possible that, after the anisotropic samarium cobalt magnetic particles 9 are magnetized, the magnetic particles 9 attract other light-absorptive magnetic particles 3 to form cores thereof, whereby the above-described mobility becomes more satisfactory and the above-described density of agglomeration is enhanced.

As has been described hereinabove, according to the present invention, first, the combination of the antinomic factors is optimized for improving the image quality of the display, which depends on the size of the microcapsules and the sizes of the particle diameters of the light-absorptive magnetic particles and the light-reflective non-magnetic particles. The distribution of diameters of the microcapsules having sealed the oily liquid dispersed therein with the light-absorptive magnetic particles and the light-reflective non-magnetic particle is optimized so that the side edge portions of the characters and images can be made sharper. The light-absorptive magnetic particles dispersed in the oily liquid in the microcapsules are minimized in size to thereby increase the surface areas thereof, and the combination of a plurality of light-absorptive magnetic particles different in particle diameter makes it possible to improve the contrast of brightness and darkness through the agglomeration of the minute magnetic particles during formation of the characters and images.

Furthermore, as the light-absorptive magnetic particles dispersed in the oily liquid in the microcapsules, when a suitable amount of the anisotropic samarium cobalt magnetic particles, which can be a permanent magnet if magnetized, is added in addition to $Fe_3O_4$ particles, the movability and agglomeration property of the magnetic particles in the microcapsules are improved, thereby improving the responsiveness in forming and erasing the characters, and the contrast of brightness and darkness.

Furthermore, the surfaces of the light-absorptive magnetic particles and the light-reflective non-magnetic particles, which are dispersed in the oily liquid in the microcapsules, are subjected to the surface treatment, thereby improving their movability during the inversion of the position therebetween.

Furthermore, the ratio between the light-absorptive magnetic particles and the light-reflective non-magnetic particles which are dispersed in the oily liquid in the microcapsules is optimized, thereby improving the contrast of brightness and darkness.

Further, a suitable amount of the only-oil-containing microcapsules having a minute particle diameter is embedded in the microcapsule coating layer. It then becomes possible that the light absorption property of the magnetic particles in the microcapsules having a relatively small particle diameter, which is present in the vicinity of an embedded portion, and the light reflection property of the non-magnetic particles, are reinforced through the action of the light refractive index of the oily liquid in the only-oil-containing microcapsules, thereby compensating for an unsatisfactory degree of contrast between brightness and darkness during formation of the images.

What is claimed is:

1. A magnetic display arrangement, comprising:
a substantially transparent non-magnetic substrate sheet: and
a layer formed from a composition containing a mixture of microcapsules coated on said substrate, said layer of microcapsules comprising a mixture of microcapsules with a substantially transparent wall containing both light-absorptive magnetic particles and light-reflective non-magnetic particles dispersed in an oily liquid therein, wherein said oily liquid having said magnetic particles and said non-magnetic particles dispersed therein has the characteristics of having a viscosity at 20° C. of 3–50 cP and a specific gravity at 20° C. of 0.85–1.05 and microcapsules with a substantially transparent wall containing only an oily liquid therein;
wherein said microcapsules containing both said light-absorptive magnetic particles and said light-reflective non-magnetic particles are provided in said mixture in at least two different sizes ranging from a minimum diameter of 100 microns to a maximum diameter of 1,000 microns; and
wherein said microcapsules containing only an oily liquid therein have an average diameter smaller than the average diameter of said microcapsules containing both said light-absorptive magnetic particles and said light-reflective non-magnetic particles therein.

2. The magnetic display arrangement of claim 1, wherein said light-absorptive magnetic particles are dispersed in said liquid of said microcapsules in a mixture of at least two different sizes ranging from a minimum diameter of 0.2 microns to a maximum diameter of several microns.

3. The magnetic display arrangement of claim 1, wherein said light-absorptive magnetic particles are mixed with particles of hard magnetic material comprising ferrite that are capable of becoming a permanent magnet.

4. The magnetic display arrangement of claim 1, and further comprising a protective layer forming a back surface, provided such that said non-magnetic substrate sheet and said protective layer have said layer of microcapsules therebetween.

5. The magnetic display arrangement of claim 4, and further comprising magnetic means for attracting and shifting said light-absorptive magnetic particles in said microcapsules toward said back surface over the entire area of said layer of microcapsules, thereby also shifting said light-reflective non-magnetic particles in said microcapsules toward a front surface defined by said non-magnetic substrate sheet.

6. The magnetic display arrangement of claim 5, and further comprising a second magnetic means for locally attracting and shifting said light-absorptive magnetic particles in said microcapsules toward said front surface, thereby also correspondingly locally shifting said light-reflective non-magnetic particles in said microcapsules toward said back surface, whereby images and characters can be formed.

7. The magnetic display arrangement of claim 1, wherein said substantially transparent wall of said microcapsules having said light-absorptive magnetic particles and said light-reflective non-magnetic particles therein comprises a wall film made of a polymer film that is substantially transparent.

8. The magnetic display arrangement of claim 1, wherein said magnetic particles and said non-magnetic particles have had a surface treatment providing the surfaces thereof with an affinity for an oily liquid for movability of said particles in said oily liquid in said microcapsules.

9. The magnetic display arrangement of claim 1, wherein the ratio of said light-absorptive magnetic particles to said light-reflective non-magnetic particles is within the range of 1:8 and 1:1.

10. The magnetic display arrangement of claim 1, wherein said oily liquid having said magnetic particles and said non-magnetic particles dispersed therein has the characteristics of having a viscosity at 20° C. of 5–20 cP and a specific gravity at 20° C. of 0.90–1.00.

11. The magnetic display arrangement of claim 10, wherein said oily liquid having said magnetic particles and said non-magnetic particles dispersed therein is dibutyl phthalate.

* * * * *